(12) United States Patent
D'Penha et al.

(10) Patent No.: US 10,114,416 B1
(45) Date of Patent: Oct. 30, 2018

(54) PARABOLIC-SHAPED RECEPTACLE AND SUPPORT MECHANISM FOR A COMPUTING DEVICE

(71) Applicant: Language Line Services, Inc., Monterey, CA (US)

(72) Inventors: Lindsay D'Penha, Carmel, CA (US); Jeffrey Cordell, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 15/583,693

(22) Filed: May 1, 2017

(51) Int. Cl.
*G06F 1/16* (2006.01)

(52) U.S. Cl.
CPC .......... *G06F 1/1632* (2013.01); *G06F 1/1688* (2013.01)

(58) Field of Classification Search
CPC .............................. G06F 1/1632; G06F 1/1688
See application file for complete search history.

(56) References Cited

U.S. PATENT DOCUMENTS

| | | | | |
|---|---|---|---|---|
| 1,645,329 A * | 10/1927 | Kanders | ............... | G10K 11/025 181/192 |
| 8,256,568 B2 * | 9/2012 | Lin | ...................... | H04B 1/3888 181/176 |
| 8,522,917 B1 * | 9/2013 | Oh | ......................... | G10K 11/08 181/148 |
| 8,781,146 B2 * | 7/2014 | Haymond | ............... | H04R 1/347 381/336 |
| 9,027,701 B2 * | 5/2015 | Center | ..................... | H04R 1/02 181/202 |
| 9,084,041 B2 * | 7/2015 | Tsai | ........................ | H04R 1/02 |
| D738,847 S * | 9/2015 | Park | ........................ | H04R 1/02 D14/188 |
| 9,241,055 B1 * | 1/2016 | Barker | .................... | H04M 1/04 |
| 9,788,621 B2 * | 10/2017 | Kim | ....................... | A45C 11/00 |
| 2002/0009195 A1 * | 1/2002 | Schon | ................. | B60R 11/0241 379/454 |
| 2010/0219012 A1 * | 9/2010 | Baumbach | ........... | G10K 11/025 181/177 |
| 2012/0027237 A1 * | 2/2012 | Lin | ......................... | H04R 1/02 381/340 |
| 2012/0303146 A1 * | 11/2012 | Genov | ..................... | H04R 1/30 700/94 |
| 2013/0052956 A1 * | 2/2013 | McKell | ................... | H04R 1/02 455/41.2 |
| 2013/0163186 A1 * | 6/2013 | Mizusawa | ............... | H05K 7/14 361/679.41 |
| 2013/0170686 A1 * | 7/2013 | Lester, Jr. | ............ | H04R 1/2803 381/338 |
| 2013/0229100 A1 | 9/2013 | Siddiqui et al. | | |
| 2013/0229773 A1 | 9/2013 | Siddiqui et al. | | |

(Continued)

*Primary Examiner* — Hoa C Nguyen
*Assistant Examiner* — Keith Depew
(74) *Attorney, Agent, or Firm* — Patent Ingenuity, P.C.; Samuel K. Simpson

(57) ABSTRACT

A parabolic-shaped receptacle is provided. The parabolic-shaped receptacle comprises a frame having a left side that has a left parabolic curvature and a right side that has a right parabolic curvature. Further, the parabolic-shape receptacle comprises a receiver operably connected to the frame such that the receiver receives a computing device within the frame. In addition, the parabolic-shaped receptacle comprises one or more support mechanisms operably attached to a rear portion of the frame that support the computing device in a landscape mode or a portrait mode.

17 Claims, 12 Drawing Sheets

(56) References Cited

U.S. PATENT DOCUMENTS

| | | | |
|---|---|---|---|
| 2013/0286623 A1 | 10/2013 | Slipy et al. | |
| 2013/0295549 A1* | 11/2013 | Hills | G09B 7/00 434/379 |
| 2013/0336510 A1* | 12/2013 | Lee | G06F 1/1632 381/333 |
| 2014/0085777 A1 | 3/2014 | Yeh et al. | |
| 2014/0091939 A1* | 4/2014 | Won | G10K 9/22 340/693.6 |
| 2014/0161294 A1* | 6/2014 | Haymond | H04R 1/30 381/341 |
| 2014/0166390 A1* | 6/2014 | Center | H04R 1/02 181/199 |
| 2014/0263939 A1* | 9/2014 | Rinner | F16M 11/10 248/688 |
| 2014/0332418 A1 | 11/2014 | Cheung et al. | |
| 2015/0036282 A1* | 2/2015 | Boomhour | G06F 1/1632 361/679.41 |
| 2015/0036283 A1* | 2/2015 | Suckle | G06F 1/1632 361/679.43 |
| 2015/0108313 A1* | 4/2015 | Leung | H05K 5/0204 248/351 |
| 2015/0156297 A1* | 6/2015 | Crawford | H04M 1/0262 455/26.1 |
| 2016/0066453 A1 | 3/2016 | Quehl et al. | |
| 2016/0195898 A1* | 7/2016 | Lau | H04M 1/04 361/679.41 |
| 2016/0216742 A1 | 7/2016 | Lee | |
| 2017/0004814 A1* | 1/2017 | Scheller | G10K 11/08 |
| 2017/0281120 A1* | 10/2017 | Mulumudi | H04R 1/46 |

\* cited by examiner

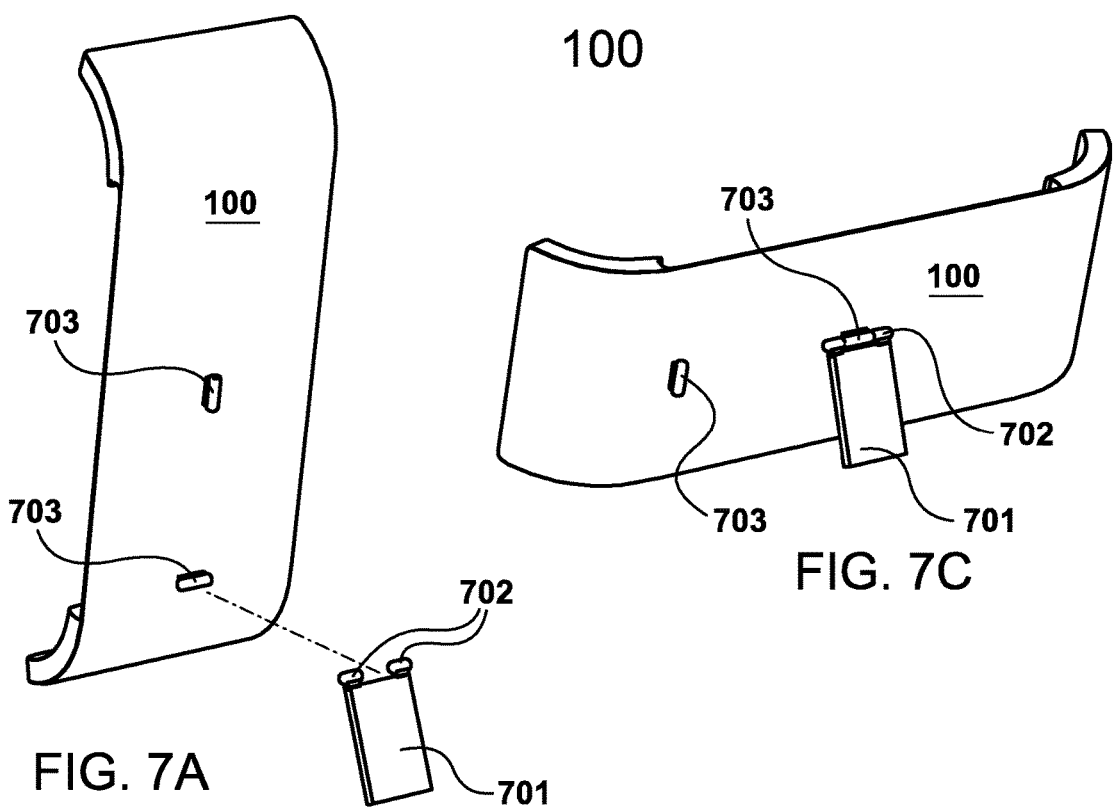
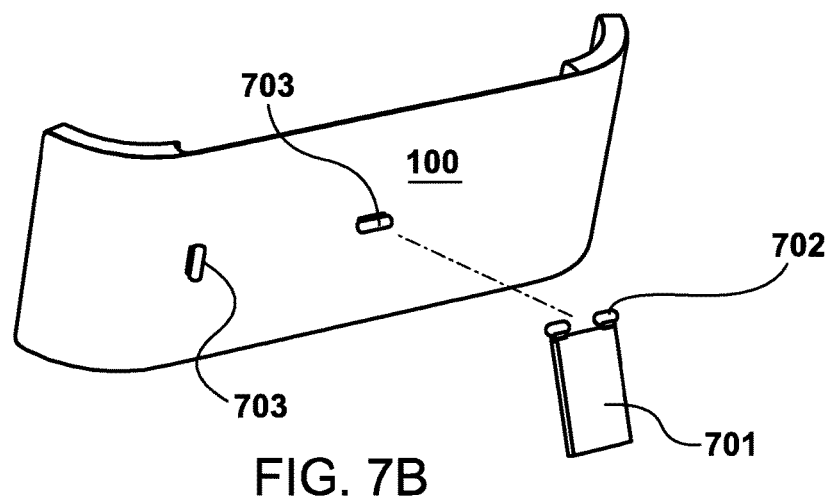

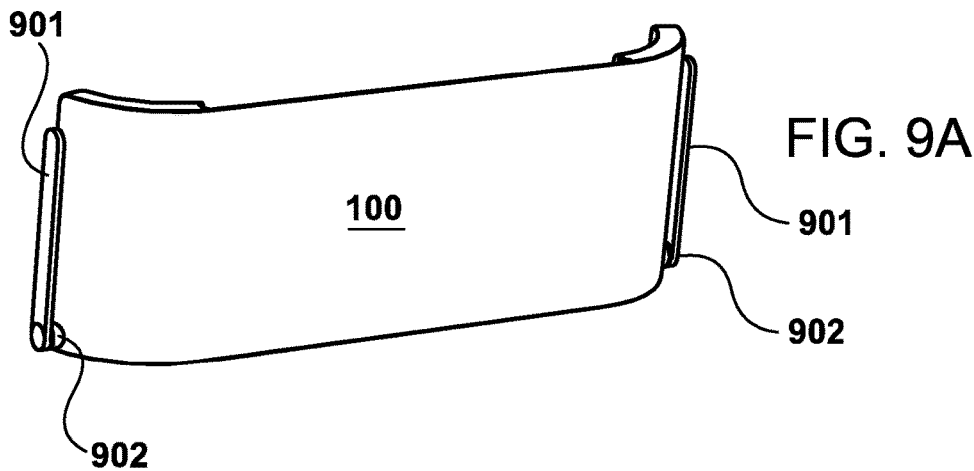
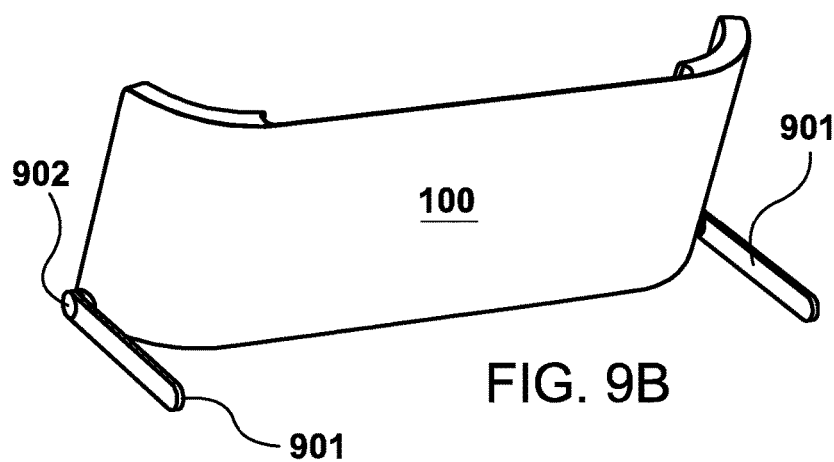
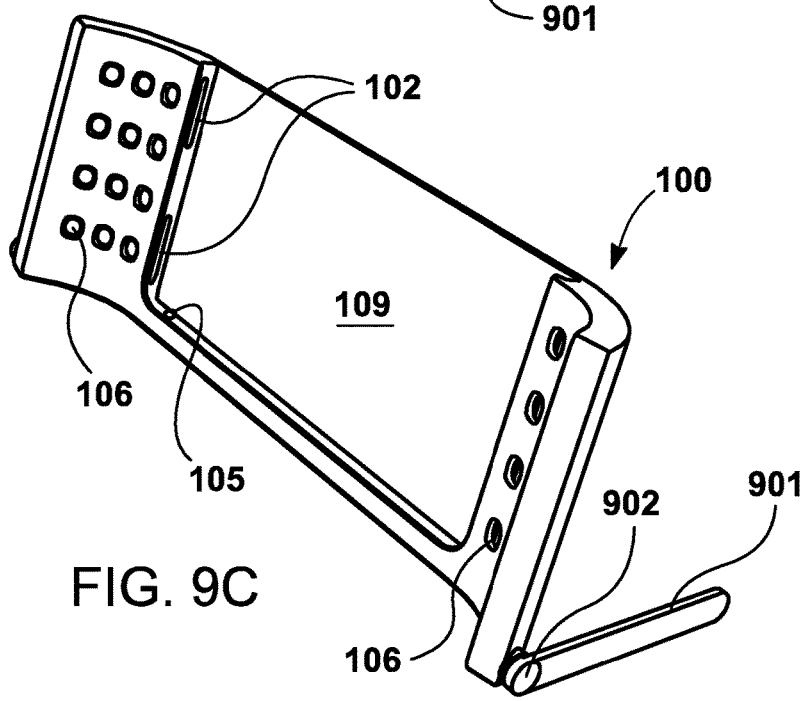

PARABOLIC-SHAPED RECEPTACLE AND SUPPORT MECHANISM FOR A COMPUTING DEVICE

BACKGROUND

1. Field

This disclosure generally relates to the field of holders for computing devices. More particularly, the disclosure relates to a parabolic-shaped receptacle and a support mechanism for a computing device.

2. General Background

With the increasing use of computing devices (e.g., smartphones, tablet devices, etc.), users are communicating to provide and/or receive various services remotely via such computing devices. For instance, various video conferencing applications allows users to use their smartphones to communicate with each other for spoken language interpretation, sign language interpretation, business meetings, medical discussions, etc.

Such technological advances have allowed users to communicate remotely but often in an inconvenient manner; for example, such users often have to use one or more hands to hold a computing device during the communication. By having to hold the computing device, a user may tire and be distracted from the communication. Further, the imagery on the recipient's computing device may be of a diminished quality as a result of the sender's hands not being still during image capture.

In addition, computing devices typically provide audio in a format that is not conducive to an optimal video conference experience in a noisy environment (e.g., stores, shopping centers, hospitals, etc.). In other words, the sound emanating from the computing device is typically intermixed with the sound in the surrounding environment. Further, the audio emanating from the computing device is typically so widespread that other users can easily hear data only intended for the one or more participants in the video conference—a significant privacy concern.

As a result, current computing devices do not have adequate audio delivery components for providing quality audio to users. In conjunction with the lack of an effective support mechanism and a lack of an audio hardware component for filtering noise adequately, current computing devices do not provide an optimal user experience during a remote communication with other computing devices.

SUMMARY

A parabolic-shaped receptacle is provided. The parabolic-shaped receptacle comprises a frame having a left side that has a left parabolic curvature and a right side that has a right parabolic curvature. Further, the parabolic-shape receptacle comprises a receiver operably connected to the frame such that the receiver receives a computing device within the frame. In addition, the parabolic-shaped receptacle comprises one or more support mechanisms operably attached to a rear portion of the frame that support the computing device in a landscape mode or a portrait mode.

Further, another parabolic-shaped receptacle comprises a frame having a left side that has a left parabolic curvature and a right side that has a right parabolic curvature. The parabolic-shaped receptacle also comprises a receiver operably connected to the frame such that the receiver receives a computing device within the frame. In addition, one or more connectors connect the frame to a stationary base in a landscape mode or a portrait mode.

Yet another parabolic-shaped receptacle comprises a frame having a left side that has a left parabolic curvature and a right side that has a right parabolic curvature. Further, the parabolic-shaped receptacle comprises one or more speaker ports. In addition, the parabolic-shaped receptacle comprises a receiver operably connected to the frame such that the receiver receives a computing device within the frame. The receiver receives a computing device such that one or more speakers of the computing device are aligned with the one or more speaker ports to deliver audio from the one or more speakers through the one or more speaker ports. In addition, the parabolic-shaped receptacle comprises one or more support mechanisms operably attached to a rear portion of the frame that support the computing device in a landscape mode or a portrait mode. The parabolic-shaped receptacle also comprises a left receptacle speaker positioned on the frame along the left parabolic curvature to the left of the one or more speaker ports. The left receptacle speaker receives the audio from the one or more speaker ports and delivering the audio to one or more users positioned in front of the left parabolic curvature. Further, the parabolic-shaped receptacle comprises a right receptacle speaker positioned on the frame along the right parabolic curvature to the right of the one or more speaker ports. The right receptacle speaker receives the audio from the one or more speaker ports and delivering the audio to the one or more users positioned in front of the right parabolic curvature.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 7A illustrates yet another alternative in which a support mechanism has a snap receiver that is snapped to a snap member on the rear of the parabolic-shaped receptacle to support a portrait mode.

FIG. 7B illustrates the support mechanism positioned within proximity to the parabolic-shaped receptacle to support a landscape mode.

FIG. 7C illustrates the support mechanism being snapped into position to support the landscape mode.

FIG. 9A illustrates a rear perspective view of the parabolic-shaped receptacle having support mechanisms that are operably attached to the parabolic-shaped receptacle via swivels, which allow the support mechanisms to be extended or retracted at different angles to effectuate varying degrees of tilt.

FIG. 9B illustrates a rear perspective view of the parabolic-shaped receptacle having the support mechanisms extended to support a landscape mode.

FIG. 9C illustrates a front perspective view of the parabolic-shaped receptacle illustrated in FIG. 9B.

DETAILED DESCRIPTION

A parabolic-shaped receptacle and a support mechanism for a computing device are provided to help optimize the viewing and/or audio experience for a user of the computing device. The support mechanism allows multiple users to avoid having to hold a portable computing device (e.g., smartphone, tablet device, etc.) during a communication with a remote user. For instance, one more users may place a smartphone in the parabolic-shaped receptacle and use the support mechanism to support the portable computing device during use of a software application so that the one or more users do not have to hold the smartphone. As an example, the computing device may be used during remote communication sessions in a hands-free manner such as for a communication based on sign language. As yet another example, the computing device may also be used for language interpretation so that a first speaker that speaks a first spoken language and a second speaker that speaks a second spoken language may remotely communicate via the computing device through a video communication application with a language interpreter on a distinct computing device. The computing device may also be used to provide a variety of other services.

Further, the parabolic-shaped receptacle focuses audio emanating from the computing device toward the user of the computing device and filters out surrounding noise; as a result, the user can effectively listen to the audio emanating from the computing device.

Accordingly, the parabolic-shaped receptacle with the support mechanism improves the usability of a computing device for communication applications. Further, the parabolic-shaped receptacle improves the delivery of audio to the user so that a user can avoid having to provide multiple requests for the same audio data. In addition, the privacy of the audio delivery is enhanced as the audio is difficult for others not situated at the audio focal point of the parabolic-shaped receptacle to hear.

Figure 1A:
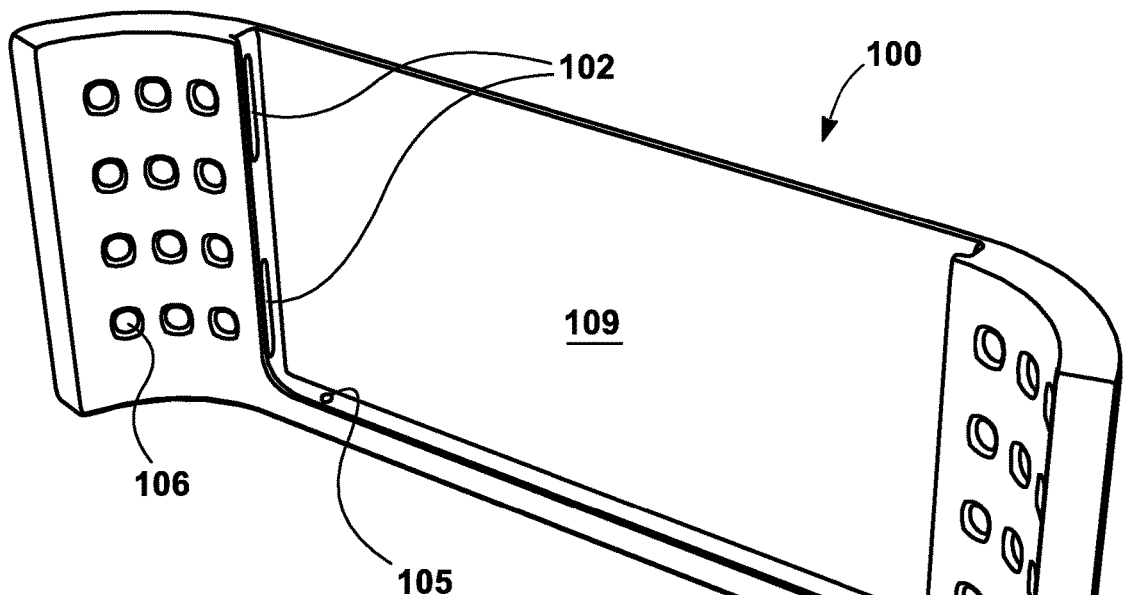
FIG. 1A illustrates a front perspective view of a parabolic-shaped receptacle with one or more support mechanisms for a landscape mode.
Figure 2A:
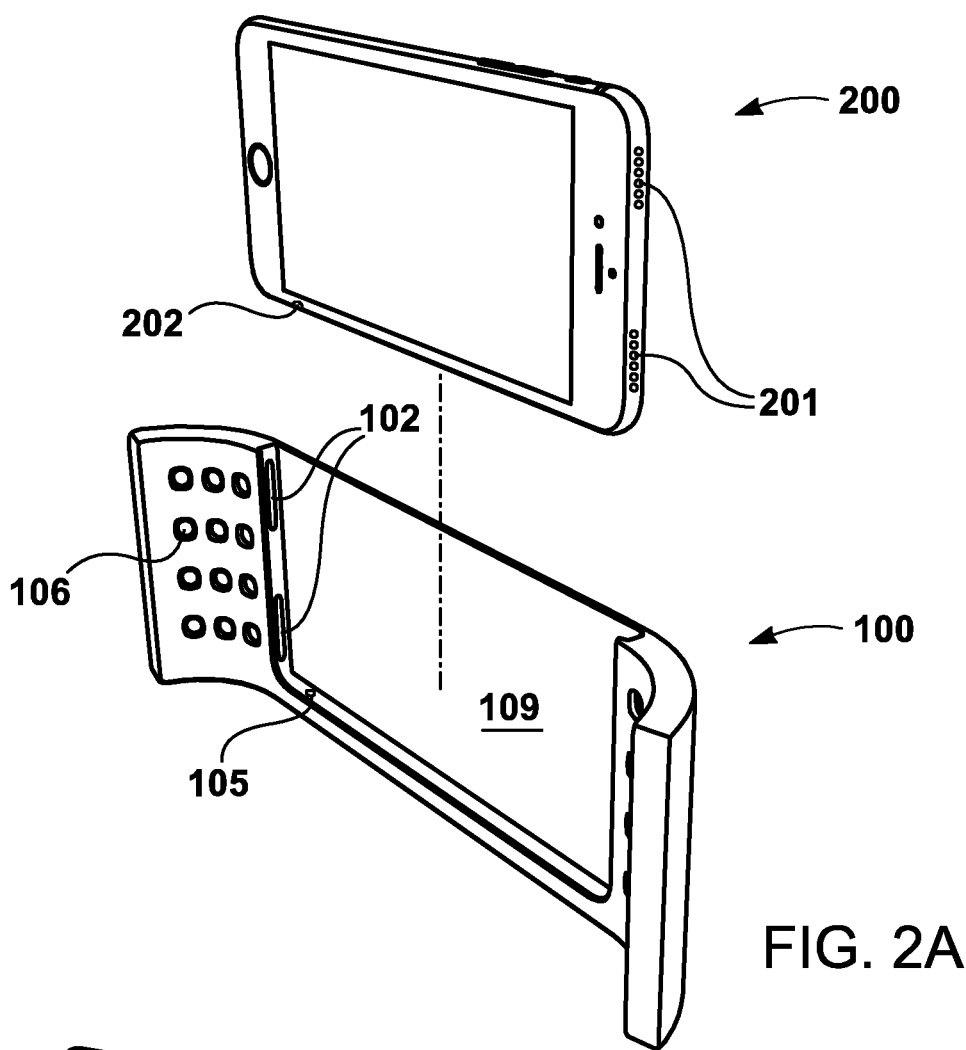
FIG. 2A illustrates a perspective view of the computing device that may be positioned within the parabolic-shaped receptacle with the support mechanisms illustrated in FIGS. 1A-1C.

FIG. 1A illustrates a front perspective view of a parabolic-shaped receptacle 100 with one or more support mechanisms 101 for a landscape mode. The parabolic-shaped receptacle 100 has a cavity 109 that receives a computing device 200 (FIG. 2A). For instance, the cavity 109 may have a recess, with or without connectors (e.g., rails), that allows the computing device 200 to be slid into the parabolic-shaped receptacle 100. The one or more support mechanisms 101 stabilize the parabolic-shaped receptacle 100 on a surface so that one or more users may view the computing device 200 during a remote communication via a hands-free experience.

The one or more support mechanisms 101 may be situated at a variety of different positions on the parabolic-shaped receptacle 100. For instance, the one or more support mechanisms 101 are illustrated in FIG. 1C as being situated at the bottom of the parabolic-shaped receptacle 100. Further, one support mechanism 101 may be used or a plurality of support mechanisms 101 may be used. The support mechanisms 101 may be integrated as part of the parabolic-shaped receptacle 100 or may be attachable/detachable. Further, the support mechanisms 101 may be fixed in a particular position (i.e., at a particular angle with respect to the parabolic-shaped receptacle 100) or may be adjustable to different positions (e.g., via a hinge). Accordingly, the support mechanism 101 may be a fixed member, a kickstand device, an attachable base, etc.

The parabolic-shaped receptacle 100 also has one or more speaker ports 102 that receive audio from the computing device 200; the audio travels through the one or more speaker ports 102 and then through one or more sound tunnels 103 (FIG. 1B) that are shaped according to the parabolic curvature of the parabolic-shaped receptacle 100. The sound tunnels 103 effectively redirect the audio emanating from the computing device 200 (FIG. 2) to one or more users through one or more receptacle speakers 106. For illustration purposes, the receptacle speakers 106 are illustrated as having a plurality of holes but may be implemented without a plurality of holes (e.g., a geometrically-shaped opening that allows sound to emanate from the parabolic-shaped receptacle 100 and obviates cleaning a plurality of smaller holes). The one or more speaker ports 102 may be fully integrated into sides of the cavity 109, partially integrated into the sides of the cavity 109 and partially integrated into the rear of the cavity 109, and/or fully integrated into the rear of the cavity 109 depending on the position of one or more speakers 201 (FIG. 2A) of the computing device 200.

In one embodiment, a speaker port 102 surrounds an entirety of speakers 201 (FIG. 2A) of the computing device 200. In another embodiment, the speaker port 102 surrounds only one speaker; therefore, the one or more speaker ports 102 may each be configured to match the size of one or more speakers 201 of the computing device 200. In other words, the one or more speaker ports 102 may be a plurality of small holes that align with a plurality of small speaker ports 102. In yet another embodiment, the one or more speaker ports 102 may be adjusted to slide to different positions for different computing devices 200. For example, the one or more speaker ports 102 may be operably attached to a sliding device so that the one or more speaker ports 102 slide up, down, sideways, to the front, to the rear, etc. to match the position of the one or more speakers 201 of the computing device 200.

Further, a microphone port 105 may surround a microphone 202 (FIG. 2A) of the computing device 200. The audio may then travel inwardly from the users through the receptacle speakers 106 toward the one or more speaker tunnels 103 so that the sound is directed toward the microphone port 105 and then the microphone 202.

In other words, the parabolic-shaped receptacle 100 may be utilized to filter audio that is emanating from the computing device 200 (FIG. 2A) to enhance the listening experience of one or more users situated in front of the parabolic-shaped receptacle 100 or to filter audio that is directed from the one or more users situated in front of the parabolic-shaped receptacle 100 from external noise so that the audio for a recipient of the communication at a remote computing device is filtered.

Even though the parabolic-shaped receptacle 100 is illustrated as being capable of receiving the computing device 200, other embodiments allow for the parabolic-shaped receptacle 100 to have an integrated computing device 200. For example, the parabolic-shaped receptacle 100 may have a built-in computing device 200.

The parabolic-shaped receptacle 100 effectively provides focused and filtered audio (e.g., at a low speaker volume) without use of an external speaker (e.g., a BLUETOOTH speaker). A variety of materials may be used in the construction of the parabolic-shaped receptacle 100 to enhance the audio focusing and filtering aspects of the parabolic-shaped receptacle 100. For example, the parabolic-shaped receptacle 100 may be constructed as a hard plastic shell but other materials may be utilized instead.

Figure 1B:
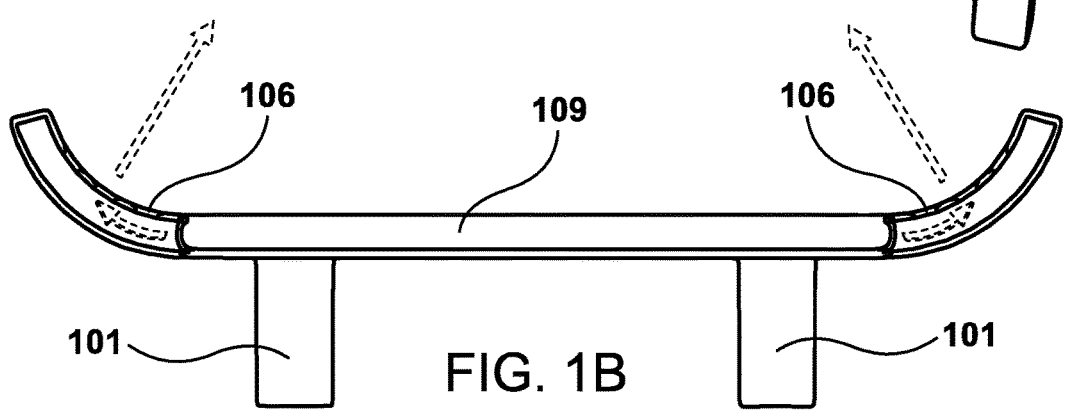
FIG. 1B illustrates a top view of the parabolic-shaped receptacle with the one or more support mechanisms for the landscape mode illustrated in FIG. 1A.
Figure 1C:
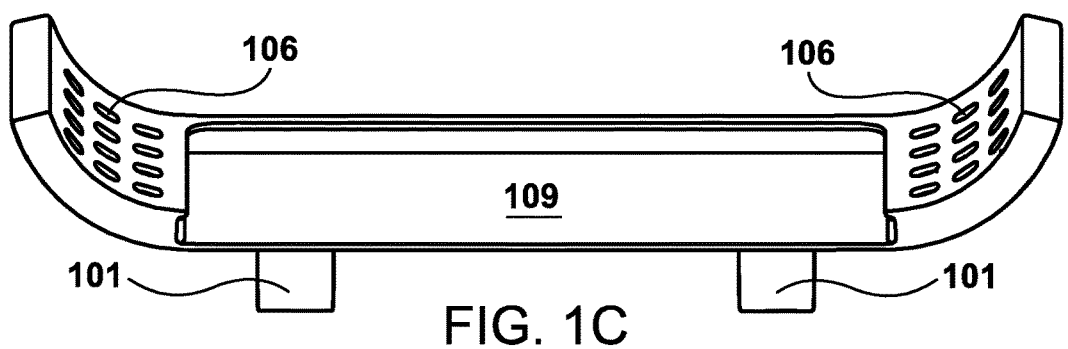
FIG. 1C illustrates a top perspective view of the parabolic-shaped receptacle with the one or more support mechanisms for the landscape mode illustrated in FIG. 1A.

FIG. 1B illustrates a top view of the parabolic-shaped receptacle 100 with the one or more support mechanisms 101 for the landscape mode illustrated in FIG. 1A. Arrows are illustrated to depict the bidirectional travel of audio through the one or more speaker tunnels 103. Further, a left and right support mechanism 101 are each illustrated for stabilization of the parabolic-shaped receptacle 100 and the computing device 200 (FIG. 2B) during use of a service provided by a software application (e.g., a video conference). The left and right support mechanism 101 are illustrated as fixed support members that may be constructed from a material that maintains a position of the parabolic-shaped receptacle 100 and the computing device 200 in landscape mode for hands-free use (e.g., steel, aluminum, plastic, rubber, etc.). Further, FIG. 1C illustrates a top perspective view of the parabolic-shaped receptacle 100 with the one or more support mechanisms 101 for the landscape mode illustrated in FIG. 1A.

Figure 2B:
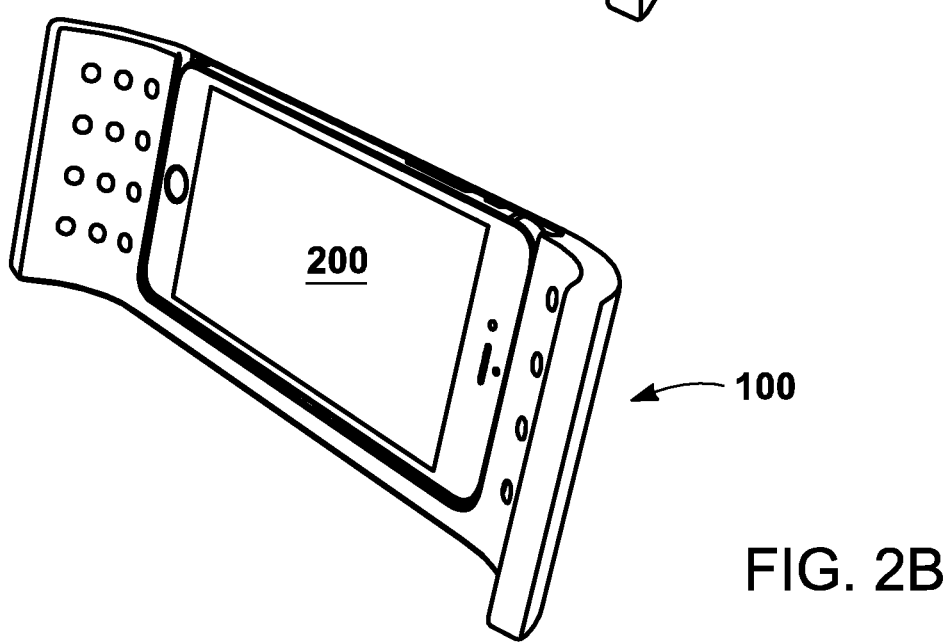
FIG. 2B illustrates a perspective view of the computing device coupled to the parabolic-shaped receptacle with the support mechanisms.

FIG. 2A illustrates a perspective view of the computing device 200 that may be positioned within the parabolic-shaped receptacle 100 with the support mechanisms 101 illustrated in FIGS. 1A-1C. Further, FIG. 2B illustrates a perspective view of the computing device 200 coupled to the parabolic-shaped receptacle 100 with the support mechanisms 101.

Figure 3A:
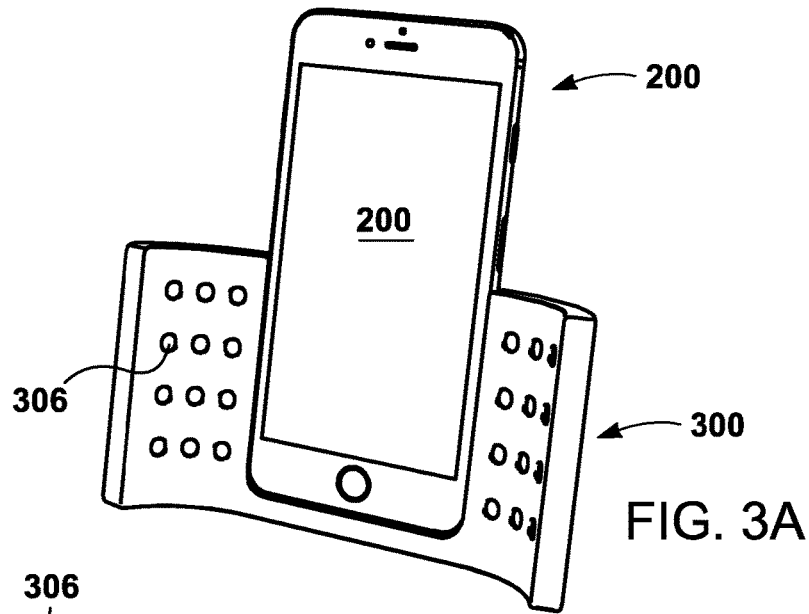
FIG. 3A illustrates a front perspective view of a partially enclosed parabolic-shaped receptacle with one or more support mechanisms for a portrait mode.

Even though the parabolic-shaped receptacle 100 and the support mechanisms 101 are illustrated in FIGS. 1A-1C, 2A, and 2B as receiving and supporting the computing device 200 in a landscape mode, additional embodiments may alternatively or additionally provide for a portrait mode. FIG. 3A illustrates a front perspective view of a partially enclosed parabolic-shaped receptacle 300 with one or more support mechanisms 301 (FIG. 3C) for a portrait mode. The partially enclosed parabolic-shaped receptacle 300 partially encloses the computing device 200 in a portrait mode to focus audio from audio speakers 201 (FIG. 2A) positioned on the enclosed sides or bottom of the computing device 200 through receptacle speakers 306. Further, the parabolic-shaped receptacle 100 with the one or more support mechanisms 101 for the landscape mode illustrated in FIG. 1A may also be configured in such a manner for the landscape mode.

Figure 3B:
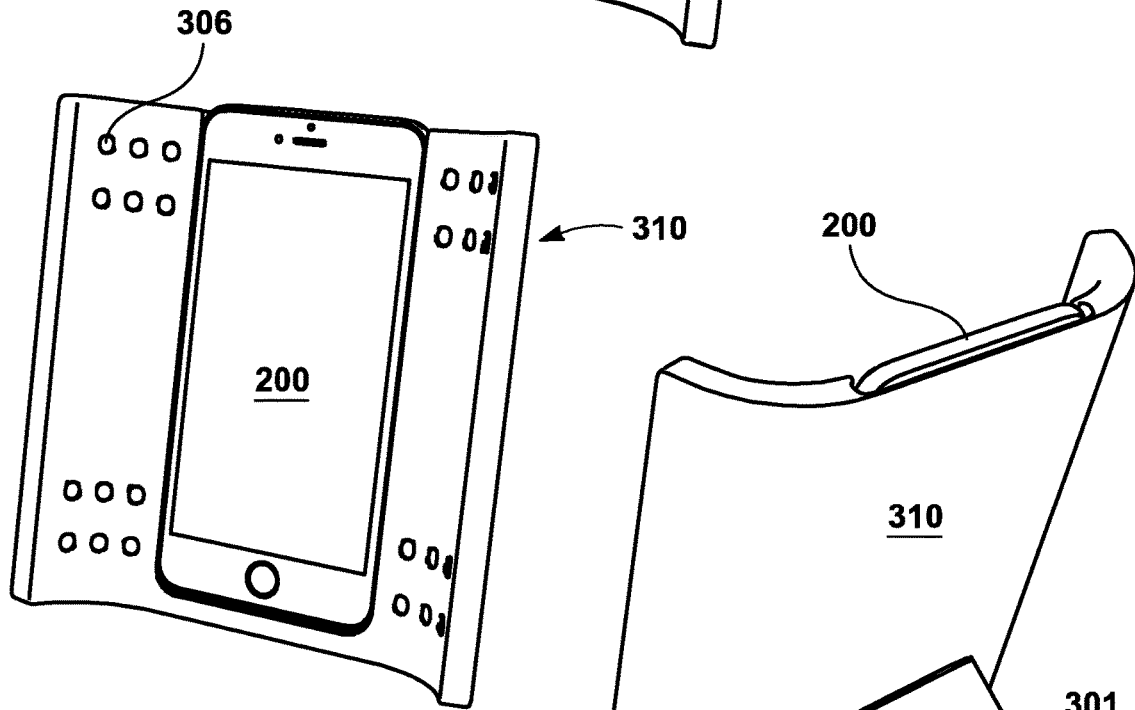
FIG. 3B illustrates a front perspective view of a fully enclosed parabolic-shaped receptacle.
Figure 3C:
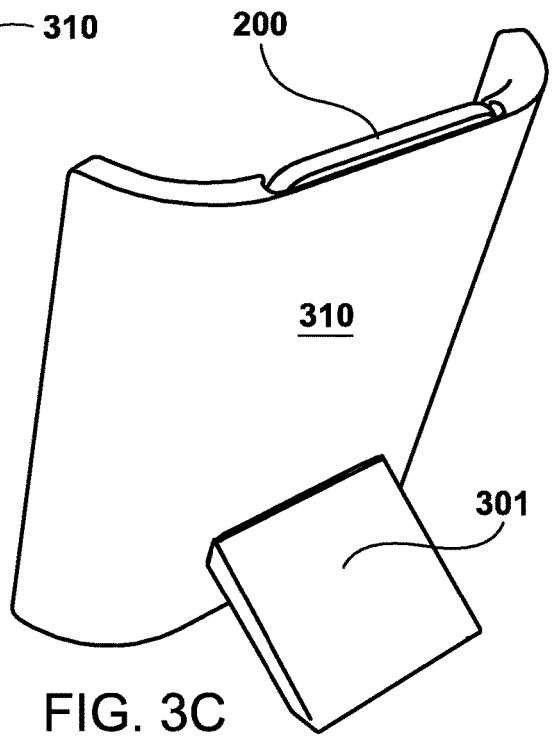
FIG. 3C illustrates a rear perspective view of the fully enclosed parabolic-shaped receptacle illustrated in FIG. 3B with a support member positioned on the bottom of the fully enclosed parabolic-shaped receptacle to stabilize the computing device in the portrait mode.

Alternatively, FIG. 3B illustrates a front perspective view of a fully enclosed parabolic-shaped receptacle 310. Further, FIG. 3C illustrates a rear perspective view of the fully enclosed parabolic-shaped receptacle 310 illustrated in FIG. 3B with a support member 301 positioned on the bottom of the fully enclosed parabolic-shaped receptacle 310 to stabilize the computing device 200 in the portrait mode. One or more support members 301 of various materials, configurations, and/or sizes in various positions may be used in a similar manner as discussed with respect to the support members 101 of FIGS. 1A-2B.

Figures 4A, 4B:
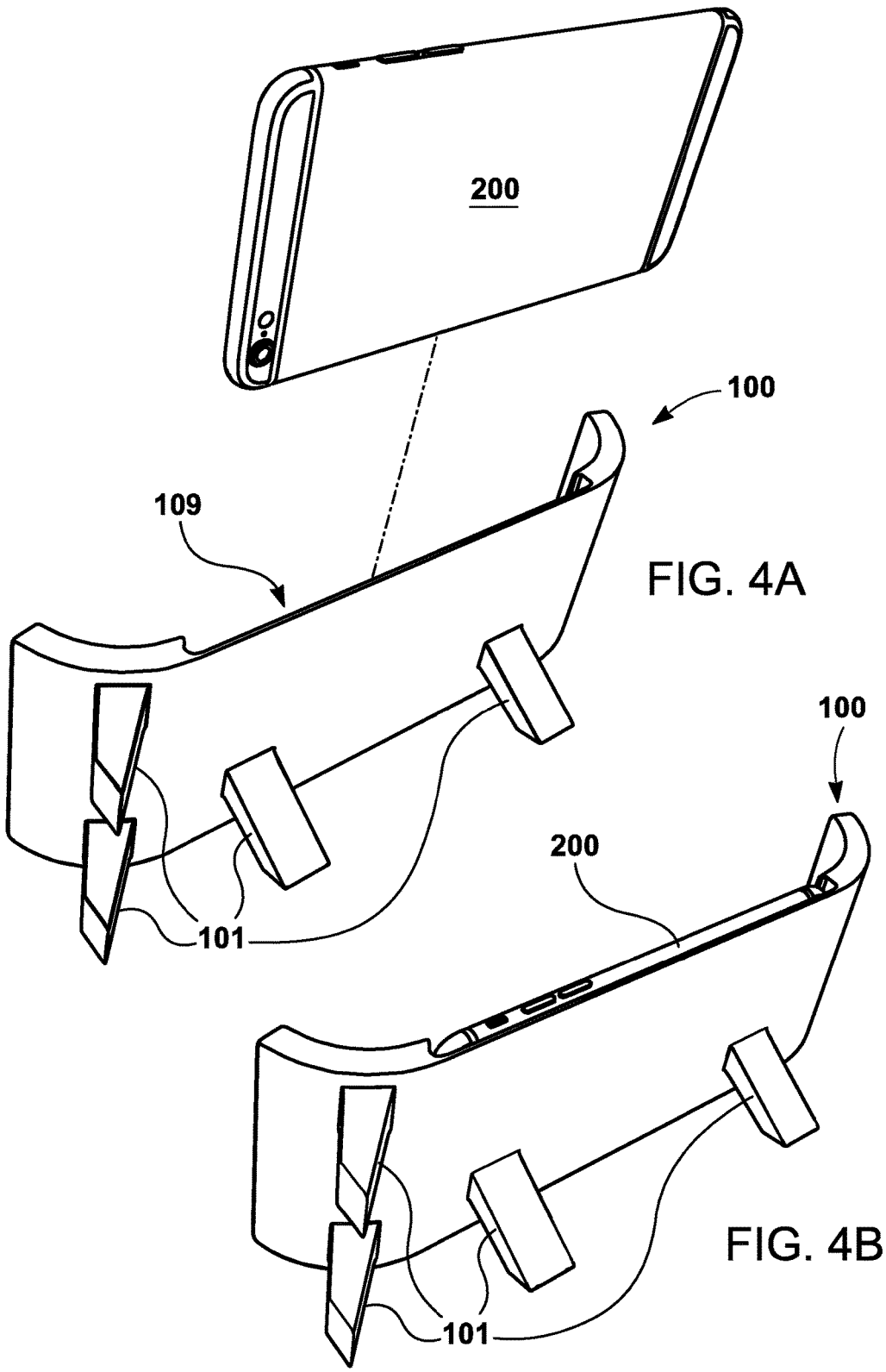
FIG. 4A illustrates the parabolic-shaped receptacle with one or more support mechanisms for either a landscape mode or a portrait mode.
FIG. 4B illustrates the computing device positioned within the parabolic-shaped receptacle in the landscape mode with support members supporting the landscape mode and additional support members vertically positioned for a possible portrait mode.

Even though FIGS. 1A-2B illustrate a configuration that is solely usable in a landscape mode and FIGS. 3A-3C illustrate a configuration that is solely usable in a portrait mode, various embodiments allow for support mechanisms situated on the parabolic-shaped receptacle 100 (FIG. 1A), the fully enclosed parabolic-shaped receptacle 310, or variants thereof so that a configuration may be alternatively positioned by a user in a landscape or portrait mode. For example, FIG. 4A illustrates the parabolic-shaped receptacle 100 with one or more support mechanisms 101 for either a landscape mode or a portrait mode. When the parabolic-shaped receptacle 100 is positioned in a landscape mode, the one or more support members 101 horizontally positioned at the bottom of the parabolic-shaped receptacle 100 stabilize the computing device 200 after it is inserted into the parabolic-shaped receptacle 100. FIG. 4B illustrates the computing device 200 positioned within the parabolic-shaped receptacle 100 in the landscape mode with support members 101 supporting the landscape mode and additional support members 101 vertically positioned for a possible portrait mode.

Figures 4C, 4D:
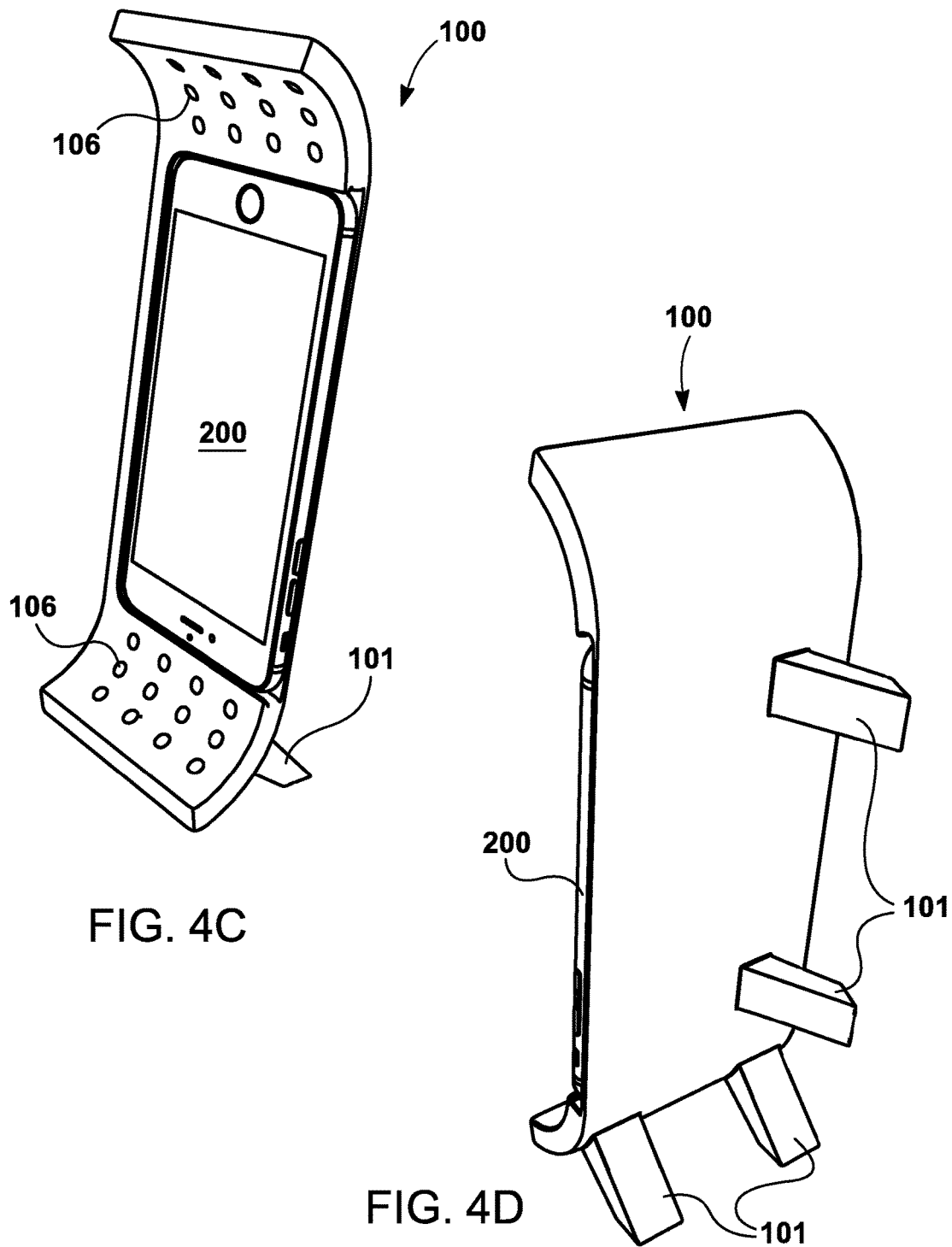
FIG. 4C illustrates a front perspective view of the parabolic-shaped receptacle of FIG. 4B in which the orientation of the parabolic-shaped receptacle is changed to be in a portrait mode.
FIG. 4D illustrates a rear perspective view of the parabolic-shaped receptacle of FIG. 4C such that the used support members are horizontally positioned to support the portrait mode and the unused support members are vertically positioned to possibly support a landscape mode if a user changes the orientation of the parabolic-shaped receptacle.

FIG. 4C illustrates a front perspective view of the parabolic-shaped receptacle 100 of FIG. 4B in which the orientation of the parabolic-shaped receptacle 100 is changed to be in a portrait mode. The support mechanisms that were unused and vertically positioned in FIG. 4B are used to support the computing device 200 and are horizontally positioned in FIG. 4C. Further, FIG. 4D illustrates a rear perspective view of the parabolic-shaped receptacle 100 of FIG. 4C such that the used support members 101 are horizontally positioned to support the portrait mode and the unused support members are vertically positioned to possibly support a landscape mode if a user changes the orientation of the parabolic-shaped receptacle 100. Accordingly, a single receptacle may be used to provide both a landscape mode and a portrait mode depending upon user preference, particular requirements of a software application being executed by the computing device 200, etc.

Figure 5A:
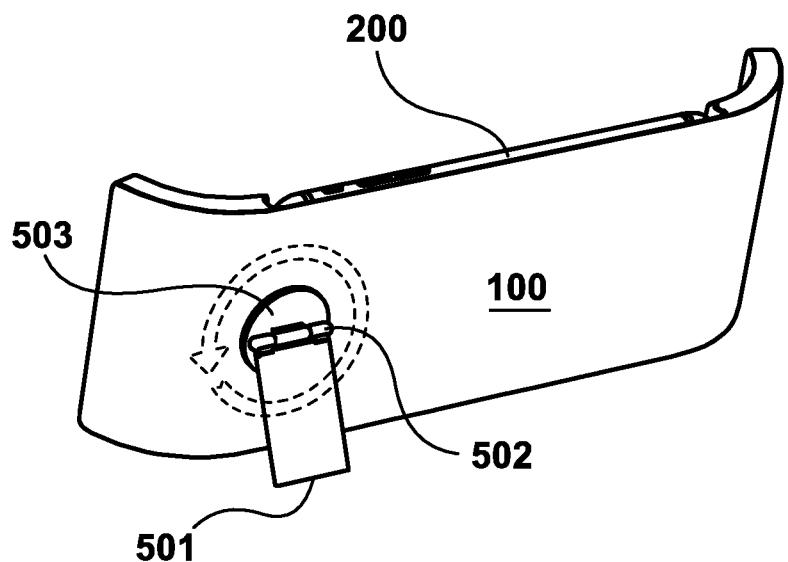
FIG. 5A illustrates a rear perspective view of the parabolic-shaped receptacle with a support mechanism that is connected to a rotatable disc via a hinge 502.
Figure 5B:
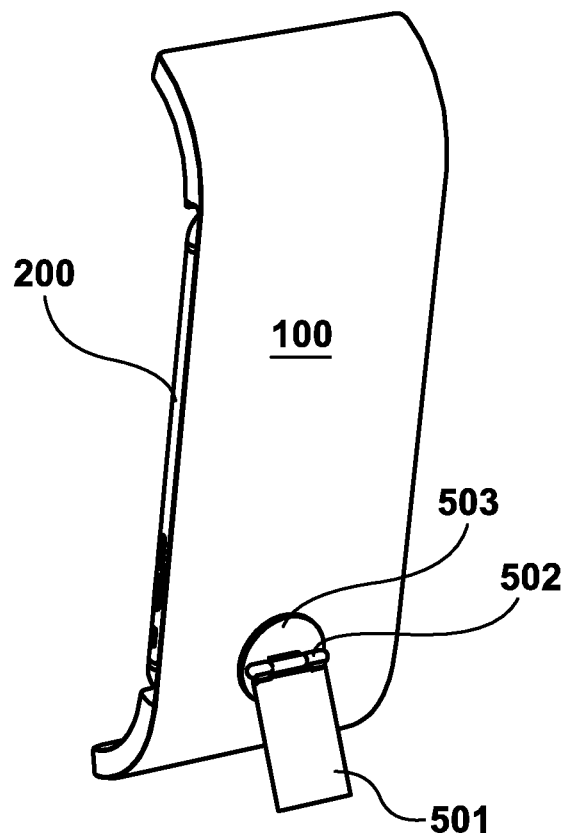
FIG. 5B illustrates a rear perspective view of the parabolic-shaped receptacle illustrated in FIG. 5A in a portrait mode.

Rather than having multiple support mechanisms 101 (FIG. 4A) positioned on the parabolic-shaped receptacle 100 (FIG. 4A) to allow for a landscape mode or a portrait mode, various embodiments allow for use of less support mechanisms 101 to provide the landscape mode or the portrait mode. For instance, FIG. 5A illustrates a rear perspective view of the parabolic-shaped receptacle 100 with a support mechanism 501 that is connected to a rotatable disc 503 via a hinge 502. Accordingly, the support mechanism 501 may be rotated to support a landscape position or a portrait position of the computing device 200. For example, FIG. 5B illustrates a rear perspective view of the parabolic-shaped receptacle 100 illustrated in FIG. 5A in a portrait mode. Further, the hinge 502 allows the parabolic-shaped receptacle 100 to be tilted to varying degrees via the bottom of the support mechanism 501 moving towards or away from the rear of the parabolic-shaped receptacle 100. In other words, the hinge 502 allows the support mechanism 501 to act as a kickstand for the parabolic-shaped receptacle 100. Alternatively, the support mechanism 501 and the rotatable disc 503 may be implemented without the hinge 502 so that a fixed support mechanism 501 is rotated to a landscape or a portrait position.

Figure 6A:
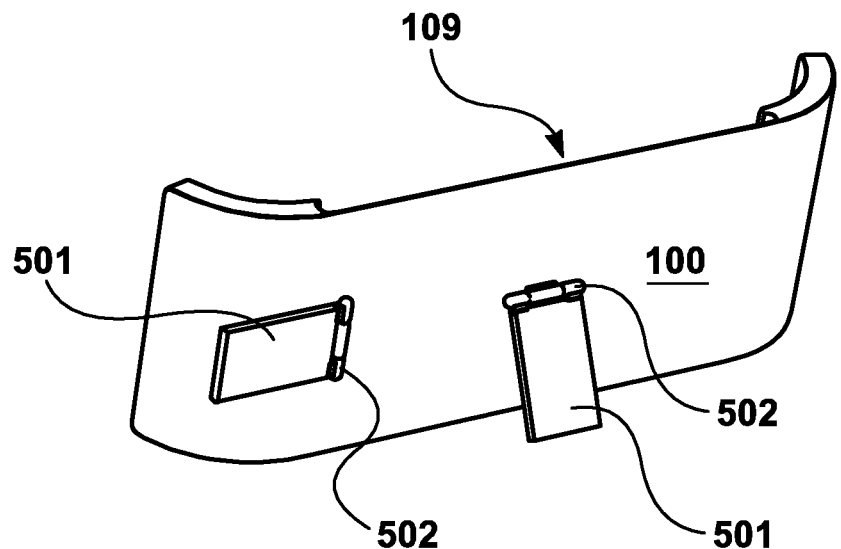
FIG. 6A illustrates a rear perspective view of the parabolic-shaped receptacle with multiple support mechanisms that may be unfolded via the hinge when used in a landscape mode and folded when unused in a portrait mode.
Figure 6B:
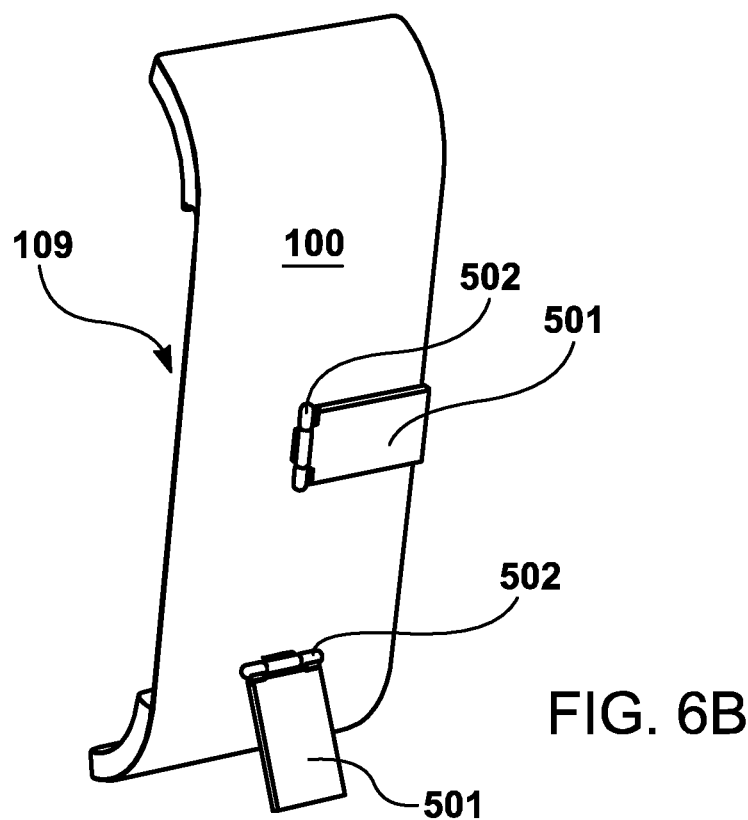
FIG. 6B illustrates a rear perspective view of the parabolic-shaped receptacle illustrated in FIG. 6A in a portrait mode.

Rather than having multiple support mechanisms 101 protruding from the rear perspective view of the parabolic-shaped receptacle 100 as illustrated in FIG. 4A, various other embodiments allow for folding unused support mechanisms 101. For instance, FIG. 6A illustrates a rear perspective view of the parabolic-shaped receptacle 100 (FIG. 1A) with multiple support mechanisms 501 that may be unfolded via the hinge 501 when used in a landscape mode and folded when unused in a portrait mode. Further, FIG. 6B illustrates a rear perspective view of the parabolic-shaped receptacle 100 illustrated in FIG. 6A in a portrait mode.

FIG. 7A illustrates yet another alternative in which a support mechanism 701 has a snap receiver 702 that is snapped to a snap member 703 on the rear of the parabolic-shaped receptacle 100 to support a portrait mode. An unused snap member 703 may alternatively be connected with the snap receiver 702 of the support mechanism 701 to support a landscape mode. For example, FIG. 7B illustrates the support mechanism 701 positioned within proximity to the parabolic-shaped receptacle 100 to support a landscape mode. In addition, FIG. 7C illustrates the support mechanism 701 being snapped into position to support the landscape mode. Even though the snap member 703 is illustrated on the rear of the parabolic-shaped receptacle 100, the snap member 703 may, alternatively, be positioned on the support mechanism 701, and the snap receiver 702 may be positioned on the rear of the parabolic-shaped receptacle 100. Further, other connectors (e.g., fasteners, clips, hooks, etc.) may be used in place of the snap receiver 702 and the snap member 703.

Figures 8A, 8B:
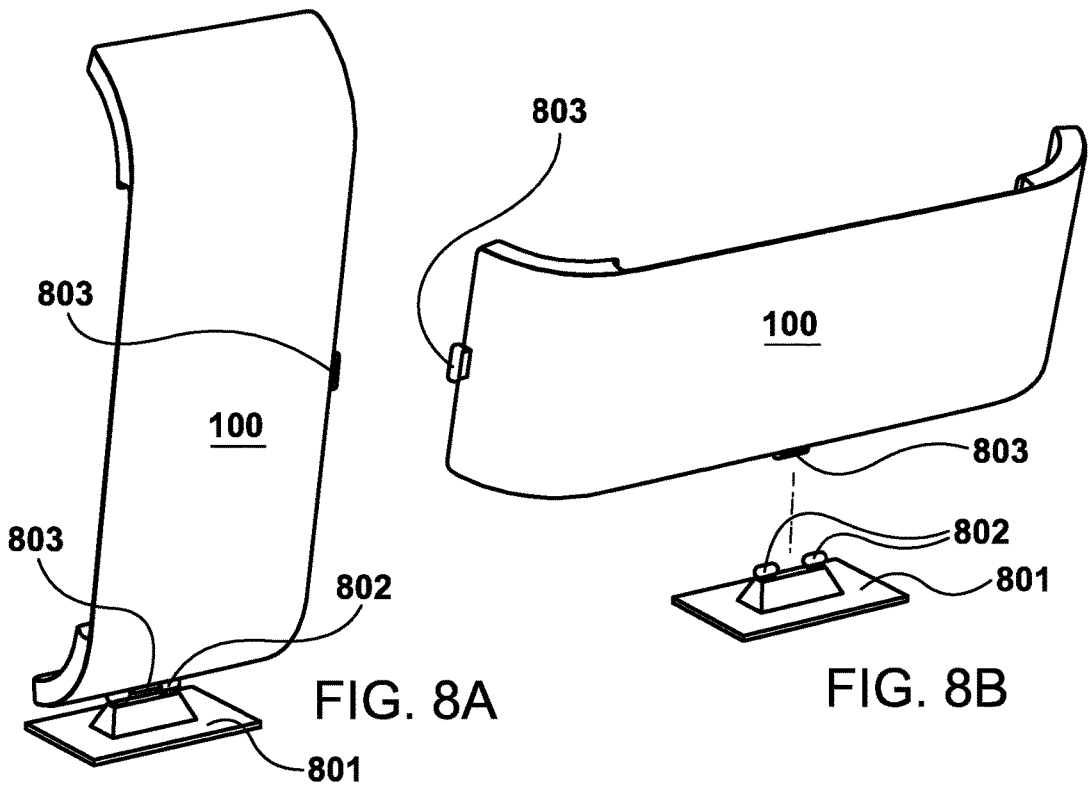
FIG. 8A illustrates a rear perspective view of a stationary base having hinge receivers that receiver a hinge member that is connected to the parabolic-shaped receptacle.
FIG. 8B illustrates a rear perspective view of the parabolic-shaped receptacle having the unused hinge member illustrated in FIG. 8A being used for a landscape mode.
Figure 8C:
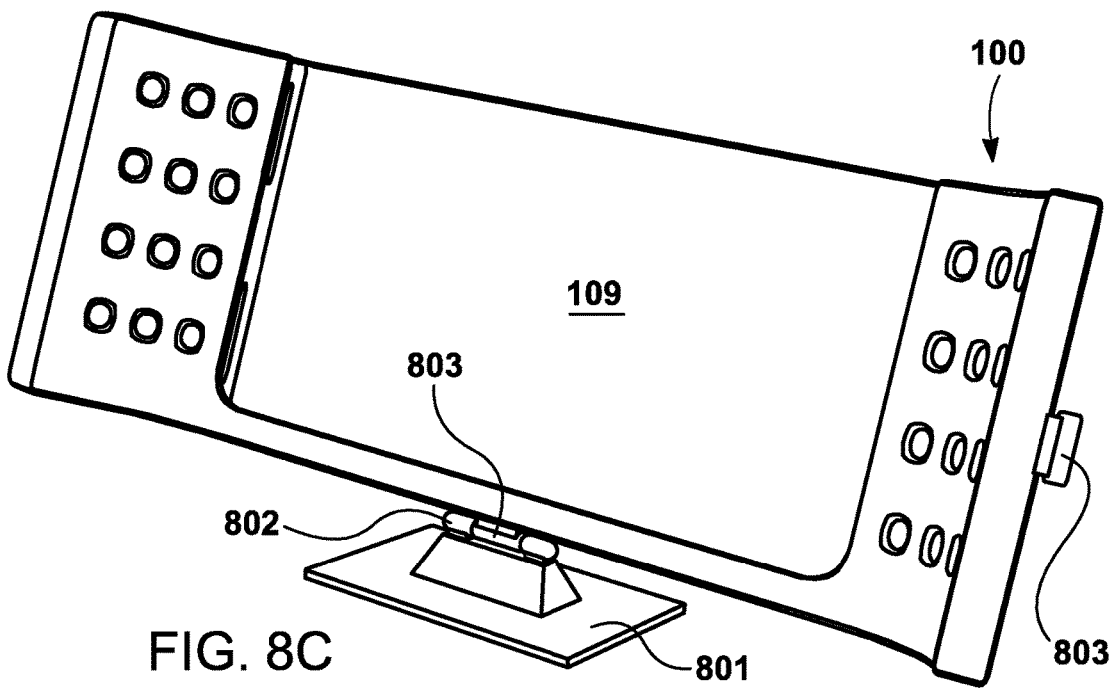
FIG. 8C illustrates a front perspective view of the parabolic-shaped receptacle attached to the stationary base in the landscape mode.

The configurations illustrated in 5A-7C allow for the parabolic-shaped receptacle 100 to be tilted by adjusting the support mechanism 501 or 701 (e.g., via the hinge 501). Various other embodiments allow for the parabolic-shaped receptacle 100 to be tilted by adjusting the parabolic-shaped receptacle 100 with respect to a stationary support mechanism. For example, FIG. 8A illustrates a rear perspective view of a stationary base 801 having hinge receivers 802 that receive a hinge 803 member that is connected to the parabolic-shaped receptacle 100. The parabolic-shaped receptacle 100 may also have an unused hinge member 803 to allow for the orientation of the parabolic-shaped receptacle 100 to be changed to a landscape mode. FIG. 8B illustrates a rear perspective view of the parabolic-shaped receptacle 100 having the unused hinge member 803 illustrated in FIG. 8A being used for a landscape mode. Further, FIG. 8C illustrates a front perspective view of the parabolic-shaped receptacle 100 attached to the stationary base 801 in the landscape mode. The parabolic-shaped receptacle 100 may be tilted with respect to the stationary base 801 via the hinge member 803. Alternatively, the hinge receivers may be positioned on the parabolic-shaped receptacle 100, and the hinge member may be positioned on the stationary base 801.

In yet another embodiment, the tilt of the parabolic-shaped receptacle 100 (FIG. 1A) may be adjusted via support mechanisms attached to the curved portions of the parabolic-shaped receptacle 100. For example, FIG. 9A illustrates a rear perspective view of the parabolic-shaped receptacle 100 having support mechanisms 901 that are operably attached to the parabolic-shaped receptacle 100 via swivels 902, which allow the support mechanisms to be extended or retracted at different angles to effectuate varying degrees of tilt. FIG. 9B illustrates a rear perspective view of the parabolic-shaped receptacle 100 having the support mechanisms 901 extended to support a landscape mode. Further, FIG. 9C illustrates a front perspective view of the parabolic-shaped receptacle 100 illustrated in FIG. 9B. Alternatively, the support mechanisms 901 may be operably attached to the partially enclosed parabolic-shaped receptacle 300 illustrated in FIG. 9A or the fully enclosed parabolic-shaped receptacle 310 illustrated in FIG. 9B.

Figure 10A:
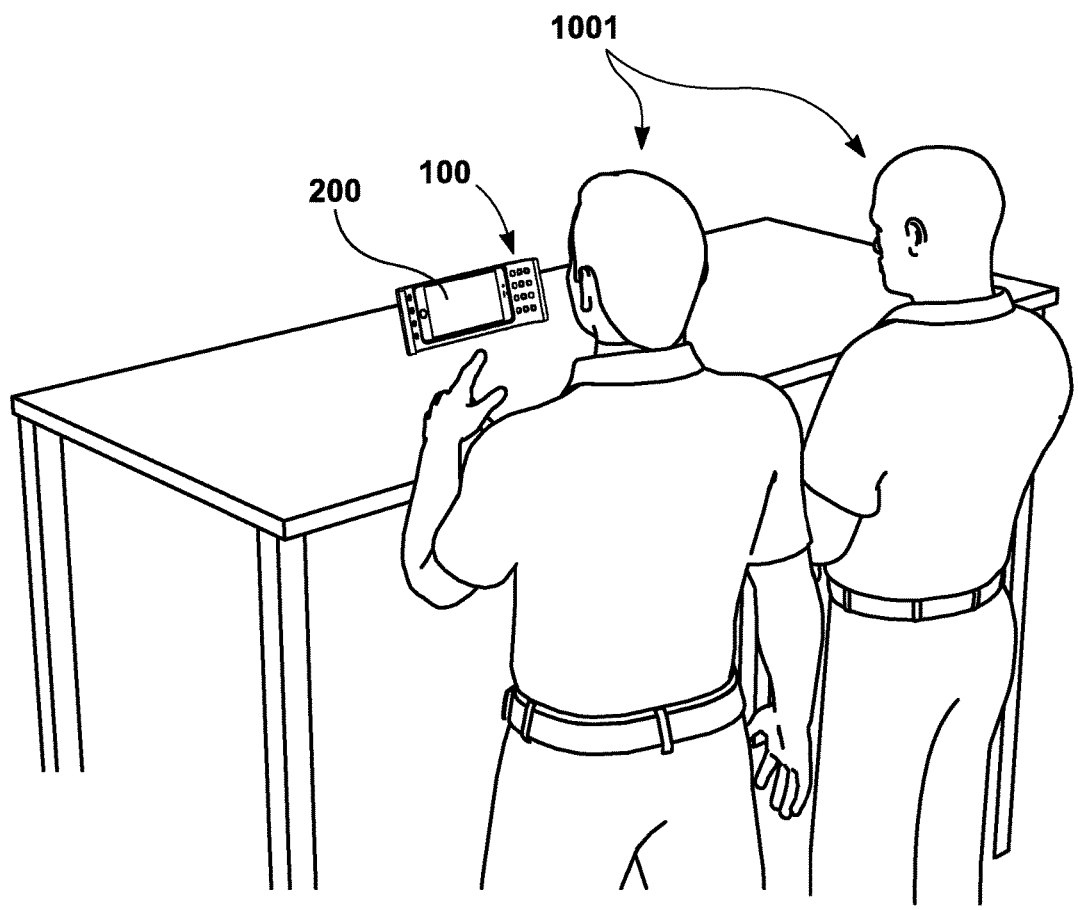
FIG. 10A illustrates perspective view of an example in which the computing device is situated in the parabolic-shaped receptacle that is resting on a surface for viewing by one or more users.
Figure 10B:
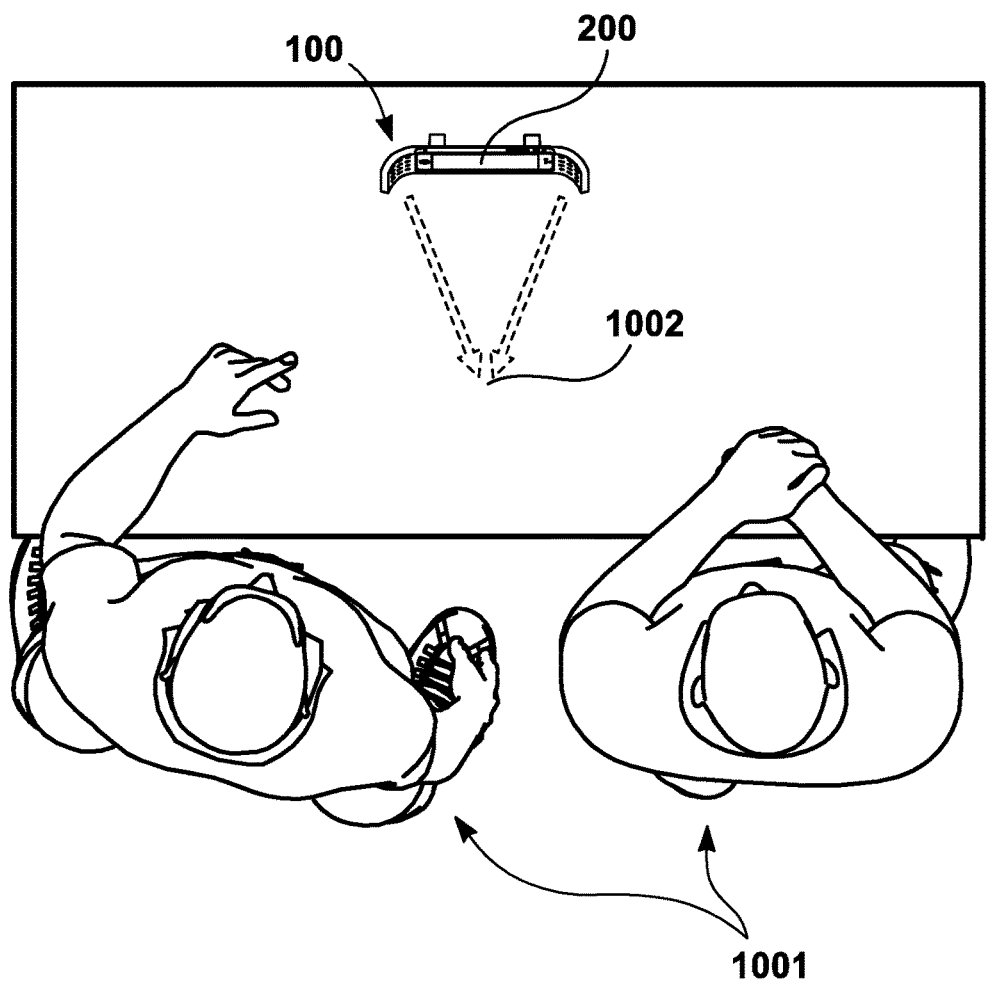
FIG. 10B illustrates a top view of the one or more users viewing the computing device, and the audio emanating from the curved portions of the parabolic-shaped receptacle being directed toward an audio focal point for optimal listening by the one or more users.

Further, FIG. 10A illustrates perspective view of an example in which the computing device 200 is situated in the parabolic-shaped receptacle 100 that is resting on a surface for viewing by one or more users 1001. FIG. 10B illustrates a top view of the one or more users 1001 viewing the computing device 200, and the audio emanating from the curved portions of the parabolic-shaped receptacle 100 being directed toward an audio focal point 1002 for optimal listening by the one or more users 1001. The audio focal point 1002 is illustrated at an optimal distance from the parabolic-shaped receptacle 100 (e.g., approximately five feet) to effectively focus the audio emanating from the computing device 200 toward the one or more users 1002.

The parabolic-shaped receptacle 100 may have a variety of parabolic curvatures along different axes to filter noise emanating from the parabolic-shaped receptacle 100 and being received by the parabolic-shaped receptacle 100. For instance, the parabolic-shaped receptacle 100 illustrated in FIG. 1A has a parabolic curvature around a y-axis. Various other embodiments, alternatively or additionally, may be used for have a parabolic curvature around an x-axis (e.g., vertical curvature of corners).

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A parabolic-shaped receptacle comprising:
   a frame having a left side that has a left parabolic curvature and a right side that has a right parabolic curvature;
   a receiver operably connected to the frame such that the receiver receives a computing device within the frame; and
   one or more support mechanisms operably attached to a rear portion of the frame that support the computing device in a landscape mode or a portrait mode, wherein the one or more support mechanisms are positioned in fixed portions at the rear of the frame such that a first portion of the one or more support mechanisms supports the landscape mode and a second portion of the one or more support mechanisms supports the portrait mode.

2. The parabolic-shaped receptacle of claim 1, further comprising one or more hinges operably attached to the one or more support mechanisms and the rear portion of the frame such that the computing device is tilted via adjustments to the one or more support mechanisms.

3. The parabolic-shaped receptacle of claim 1, wherein the computing device is a smartphone.

4. The parabolic-shaped receptacle of claim 1, wherein the computing device is a tablet device.

5. The parabolic-shaped receptacle of claim 1, wherein a first tilt of the first portion is adjustable and a second tilt of the second portion is adjustable.

6. The parabolic-shaped receptacle of claim 1, further comprising a first hinge that adjusts the tilt of the first portion and a second hinge that adjusts the tilt of the second portion.

7. A parabolic-shaped receptacle comprising:
   a frame having a left side that has a left parabolic curvature and a right side that has a right parabolic curvature;
   a receiver operably connected to the frame such that the receiver receives a computing device within the frame; and
   one or more receivers that connect the frame to a stationary base in a landscape mode or a portrait mode, wherein the one or more receivers are positioned in fixed portions at the rear of the frame such that the stationary base supports the landscape mode during connection of a first portion of the one or more receivers to the stationary base and such that the stationary base supports the portrait mode during connection of a second portion of the one or more receivers to the stationary base.

8. The parabolic-shaped receptacle of claim 7, further comprising one or more hinges operably attached to the one or more receivers such that the computing device is tilted via adjustments to the frame.

9. The parabolic-shaped receptacle of claim 7, wherein the computing device is a smartphone.

10. The parabolic-shaped receptacle of claim 7, wherein the computing device is a tablet device.

11. A parabolic-shaped receptacle comprising:
    a frame having a left side that has a left parabolic curvature and a right side that has a right parabolic curvature;
    one or more speaker ports;
    a receiver operably connected to the frame such that the receiver receives a computing device within the frame, the receiver receiving a computing device such that one or more speakers of the computing device are aligned with the one or more speakers ports to deliver audio from the one or more speakers through the one or more speaker ports;
    one or more support mechanisms operably attached to a rear portion of the frame that supports the computing device in a landscape mode or a portrait mode;
    a left receptacle speaker positioned on the frame along the left parabolic curvature to the left of the one or more speaker ports, the left receptacle speaker receiving the audio from the one or more speaker ports and delivering the audio to one or more users positioned in front of the left parabolic curvature;
    a right receptacle speaker positioned on the frame along the right parabolic curvature to the right of the one or more speaker ports, the right receptacle speaker receiving the audio from the one or more speaker ports and delivering the audio to the one or more users positioned in front of the right parabolic curvature;
    a fixed landscape mode receiver positioned at the rear of the frame, the fixed landscape mode receiver receiving the one or more support mechanisms for positioning the computing device in the landscape mode; and
    a fixed portrait mode receiver positioned at the rear of the frame, the fixed portrait mode receiver receiving the one or more support mechanisms for positioning the computing device in the portrait mode.

12. The parabolic-shaped receptacle of claim 11, wherein the left parabolic curvature and the right parabolic curvature are curved around an x-axis.

13. The parabolic-shaped receptacle of claim 11, wherein the left parabolic curvature and the right parabolic curvature are curved around a y-axis.

14. The parabolic-shaped receptacle of claim 11, wherein the left parabolic curvature and the right parabolic curvature are curved such that the left receptacle speaker and the right receptacle speaker deliver the audio to an audio focal point in proximity to the one or more users.

15. The parabolic-shaped receptacle of claim 11, wherein the computing device is a smartphone.

16. The parabolic-shaped receptacle of claim 11, wherein the computing device is a tablet device.

17. The parabolic-shaped receptacle of claim 11, further comprising one or more hinges operably attached to the one or more support mechanisms and the rear portion of the frame such that the computing device is tilted via adjustments to the one or more support mechanisms.

* * * * *